3,116,264
CEMENT COMPOSITION CONTAINING A COPOLYMER OF MALEIC ANHYDRIDE AND CERTAIN VINYL HETERO-N-CYCLIC COMPOUNDS AND METHOD OF CEMENTING A WELL THEREWITH
Winton W. Wahl, Tulsa, Okla., assignor to The Dow Chemical Company, Midland, Mich., a corporation of Delaware
No Drawing. Filed May 9, 1960, Ser. No. 27,474
8 Claims. (Cl. 260—29.6)

The invention relates to operations wherein aqueous hydraulic cement slurries are employed. It more particularly relates to cementing wells penetrating subterranean formations wherein aqueous slurries are employed. It especially relates to improved control of viscosity and setting time of neat cement slurries. The term hydraulic cement as used herein refers exclusively to Portland and aluminous cements.

The use of an aqueous cement slurry in the production of fluids from subterranean formations has grown rapidly in importance, particularly in the production of oil and gas. The operation is broadly referred to as well-cementing. Cementing of wells, broadly, pertains to sealing off one type of fluid producing horizon from another, e.g., oil or gas bearing strata, from water or brine bearing strata, to secure casings in place, e.g., cementing a casing off bottom, which usually also adds strength and provides protection to casings, by the use of an aqueous cement slurry which sets to a unitary solid. For the satisfactory preparation and emplacement of the aqueous cement slurry in the well, the slurry must possess suitable properties such as viscosity, pumpability, thickening and setting times, and ultimate strength. Although valuable improvements have been suggested over the years to improve the characteristics of the cement slurries, improvements in some respects have usually been associated with disadvantages, e.g., improvement in setting time has tended to lower the ultimate strength. A highly informative discussion of the problems and progress made in the solution thereof, relating to oil well cementing operations, is set forth in Oil-Well Cementing Practices in the United States (1959), published by the American Petroleum Institute, New York, New York. Reference to said publication will be helpful as a source of background material applicable to cement slurries used in the practice of the invention.

A problem of a particularly serious nature in the use of hydraulic cement in wells stems from the fact that the aqueous cement slurry is often too viscous for good pumpability and/or it thickens or sets too rapidly to permit adequate time for mixing and emplacing the cement slurry in the well.

A number of attempts have been made to extend the setting times of an hydraulic aqueous cement slurry without adversely affecting other desirable properties. Such attempts include admixing substances with the slurry to retard the set thereof. Among such additaments are cellulose type materials, e.g., carboxymethylhydroxyethyl cellulose, calcium lignosulfonate, grain flours, starches, bentonite, casein, and gum arabic.

Although some of such retardants have had a beneficial effect on retarding the setting time of aqueous hydraulic cement slurries, they have not been fully satisfactory. A number of known retardants, e.g., carboxymethylhydroxyethyl cellulose, have the disadvantage of thickening the slurry excessively. Some retardants have the disadvantage of impairing the ultimate strength properties of the set cement. Still other retardants have the disadvantage of being useable within only narrow temperature ranges, many of which are entirely unsatisfactory at well temperatures above 212° F. Still others of the known retardants may be used only with one or two of the several classes of hydraulic cements described in the American Petroleum Institute Classification of Cement but are not suitable for use with other cements.

A satisfactory retardant extends both the thickening and setting times of an hydraulic cement slurry. A cement slurry thickens prior to set. Care must be exercised in the use of such slurry to avoid movement after thickening has appreciably advanced to avoid impairment of the ultimate strength properties of the set cement. Viscosity is usually taken as indicative of the extent of thickening. When an aqueous hydraulic cement slurry has acquired a viscosity of 10,000 centipoises or more it is considered to be too thick for subsequently pumping or otherwise moving.

A need, therefore, exists for an effective and satisfactory retardant which also lowers the viscosity, postpones the thickening of the slurry, and has no adverse effects upon the desirable properties of the set cement.

The invention provides a method of cementing generally, and of cementing wells, particularly, employing an improved retardant which is added to hydraulic cement compositions and imparts thereto both a longer thickening time and a longer setting time without accompanying disadvantages, and in addition thereto, is highly effective in relatively small amounts, is readily admixed with the hydraulic cement slurries, and may be injected into a well by the employment of presently used equipment.

The invention, accordingly, is an improved hydraulic cement composition and improved method of carrying out a cementing operation, e.g., cementing a well penetrating a subterranean formation, wherein an aqueous slurry of the hydraulic cement composition is prepared and injected into the well. The improvement consists of admixing, with an aqueous hydraulic cement slurry, a copolymer of maleic anhydride and an N-vinyl, 5- or 6-membered, ring compound, or mixtures thereof wherein a carbonyl group is positioned adjacent to the nitrogen atom in the ring. There is thus produced an aqueous cement slurry, which has an extended pumping and working time and a satisfactorily retarded thickening and setting time, which may be injected into the well and positioned at the level desired to produce a set cement having good compressive strength. The improvement of the invention is particularly useful in the cementing of wells having relatively high temperatures therein, e.g., 212° to 400° F.

The amount of the copolymer to employ in the practice of the invention varies somewhat with the class of hydraulic cement used. The copolymer, however, is effective as a retardant and a viscosity-lowering additament in an amount between 0.05 and 1.5 percent by weight, based on the weight of the weight of the dry cement used. The preferred concentration of the copolymer, calculated on the dry cement, is between 0.2 and 0.4 percent.

The nitrogen-containing ring compound most extensively employed with maleic anhydride in preparing the copolymer for use in the invention are N-vinyl morpholinone, N-vinyl pyrrolidone, and N-vinyl cyclic carbamates, e.g., those represented by the formulae below:

I

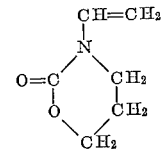

N-vinyl-2-oxazinidinone

II

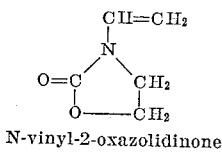

N-vinyl-2-oxazolidinone

III

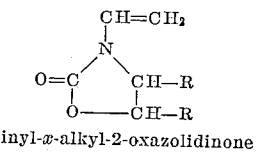

N-vinyl-x-alkyl-2-oxazolidinone

In the Formula III above, one R is the methyl or ethyl radical and the other R is either hydrogen or the methyl radical.

The preferred N-vinyl cyclic carbamate to employ has the structure of Formula III above where one R is hydrogen and the other R is either methyl or ethyl, e.g., N-vinyl-5-methyl-2-oxazolidinone or N-vinyl-4-ethyl-2-oxazolidinone. The copolymers formed between maleic anhydride and N-vinyl-5-methyl-2-oxazolidinone, for example, may be represented as containing a plurality of the following recurring groups:

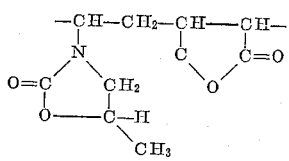

The copolymers useful as a retardant in aqueous cement slurries in accordance with the invention include the free acids and water-soluble salts obtained by hydrolysis of the acid anhydride rings in the above structure. Salts such as the alkali metal and ammonium salts are prepared by opening the anhydride rings by reaction with aqueous alkali metal hydroxides or carbonates or ammonium hydroxide. Such salts are readily soluble in both cold and hot water.

A method of preparing an alkyl-substituted N-vinyl-2-oxazolidinone is described in U.S. Patent 2,919,279.

In preparing a copolymer of maleic anhydride and an N-vinyl cyclic carbamate for use in the invention, any suitable catalyst capable of yielding free radicals, when heated in the reaction temperature range, may be employed. Such catalysts include azo-compounds such as azobisisobutyronitrile and peroxides such as lauryl peroxide, benzoyl peroxide, 2,4-dichlorobenzoyl peroxide, ditertiarybutyl peroxide, cumene hydroperoxide, tertiarybutyl hydroperoxide and the like.

The copolymerization reaction is conveniently carried out under normal atmospheric pressures although reaction under somewhat elevated or reduced pressures may be carried out if desired. Commercially available maleic anhydride sometimes contains appreciable quantities of free acid which may foster decomposition of the cyclic carbamate reactant when the reaction mixture is heated. The latter problem can be minimized by neutralizing the free acid, as, for example, by passing ammonia through the reaction mixture, before initiating the exothermic copolymerization.

The copolymers are prepared by contacting an N-vinyl cyclic carbamate as defined above with maleic anhydride in a liquid medium under the influence of free radicals. In general, it is desirable to carry out the reaction in an inert organic solvent and to employ a peroxide catalyst or the like as a source of free radicals to initiate the reaction. For use in the invention it is preferred to employ the N-vinyl cyclic carbamate and maleic anhydride reactants in substantially equimolar proportions although an excess of either reactant may be employed if desired.

The reaction is initiated and proceeds readily when the reactants are mixed and heated with catalysts capable of liberating free radicals, preferably at temperatures of from about 35° to 120° C. Alternatively, free radicals may be generated in the reaction mixture by irradiation with ultraviolet light, X-rays or gamma rays.

Any suitable inert organic solvent may be employed in the reaction. In most instances, it is desirable to employ one or a mixture of aromatic hydrocarbons, such as benzene, toluene or xylene, or halohydrocarbons, such as methylene chloride or 1,2-dichloroethane, as the solvent. In such systems the reactants are soluble while the copolymer product precipitates as formed and may be recovered by filtration or decantation. Alternatively, solvents, such as acetone or methyl ethyl ketone, in which the copolymer product is soluble, may be employed, in which the copolymer product may be recovered by conventional processes such as by distilling off the solvent. In any case, it is generally desirable that the reactants be employed in an amount of from about 5 to 25 percent by weight of the solution in the original reaction mixture.

The reaction temperature employed in the preparation of the copolymer will vary depending upon the concentration of reactants, the type and amount of catalyst, and the particular solvent or solvents employed. It is generally convenient to initiate the reaction at as low a temperature as the particular catalyst required for producing an appreciable yield of free radicals and to complete the reaction at the boiling temperature of the solvent system employed. With highly active catalysts, such as azobisisobutyronitrile the reaction may be initiated at temperatures of from 35° to 45° C. and completed by heating at such temperatures for a period of time. With less active catalysts, such as lauroyl peroxide, heating to a temperature of about 60° to 80° C. may be required for achieving an appreciable rate of reaction and the mixture may be heated at temperatures of from 80° to 120° C. to complete the reaction. In initiating reactions at temperatures above about 60° C., heating of the mixture should be gradual and controlled in order to avoid the sudden onset of polymerization at an uncontrollable rate.

The copolymers employed in the examples are designated according to the K value which is a function of the molecular weight, higher K values indicating higher molecular weights. The significance and method of finding K values is described in Cellulose Chemie, vol. 13, page 58 (1932) by H. Fikentscher. K values are found according to the method therein described, wherein the polymeric solute is dissolved in a solvent, the relative viscosity thereof measured by passing through a specified aperture at a given temperature, and the K value calculated according to the equation:

Relative viscosity =
$$10^{c[0.001K+0.000075K^2/1+0.0015Kc]}$$

where $c$ is the number of grams of polymeric solute per 100 cc. of solution. Tables are available from which K values can be read directly from the relative viscosity values.

The solvent employed in finding the K values of the copolymer employed according to the invention was 95 percent ethyl alcohol, containing a denaturing substance, and water totaling the remaining 5 percent and known as 2B alcohol. The polymer was added in the amounts of 1 percent by weight and the viscosity was determined at 25° C.

The copolymer produced is insoluble in chloroform, methanol, ortho-dichlorobenzene, toluene, and cold water but an aqueous suspension of the copolymer can be converted to a solution either by heat treatment, e.g., heating to 75° or above for at least 5 minutes, or by neutralization thereof with an alkali, e.g., an aqueous solution of NaOH.

The hydraulic cement used in the aqueous cement slurry prepared in accordance with the invention may be either Portland cement or aluminous cement and includes API cement classes: A, B, C, N, D, E, and F, as described in the American Petroleum Institute publication, API RP 10B, 8th Edition (January, 1959) entitled API Recommended Practice for Testing Oil Well Cements and Cement Additives, available from the API Division of Production, Dallas, Texas, and more fully described in Oil-Well Cementing Practices in the United States, published by the American Petroleum Institute (1959), New York, New York, particularly at page 42.

Sufficient water is used in the practice of the invention to provide a pumpable slurry that may be positioned in the well at the place desired, and which subsequently sets to a hard monolithic solid. Usually between 35 and 50 parts by weight of water per 100 parts by weight of dry cement are employed, 40 to 46 parts of water being frequently used.

In the method of mixing the ingredients of the aqueous cement composition to make a substantially uniform mixture within a period of time which permits subsequent emplacement of the slurry in the well without undue haste is satisfactory. Truck-mounted rotating barrel type mixers provided with baffles therein and tippable for removal of the the slurry therefrom as needed may be employed. An hydraulic jet mixer wherein dry cement from a hopper is fed into a line through which water is forced under high pressure to provide a venturi effect is commonly employed for cementing operations. The copolymer employed in the invention is obtainable in a dry powder form which may be readily blended into the dry cement prior to admixing with the water. On the other hand, it may be obtained or readily made into an aqueous solution of say 25 percent by weight, and admixed with the water-cement slurry.

The thus prepared slurry of the invention is positioned in the well according to conventional practice, i.e., by the use of wooden, metal, or rubber plugs one of which usually precedes and another follows the slurry down the casing of the well and thence passes, either outwardly below the bottom of the casing and then upwardly through the annulus between the casing and borehole wall, or passes outwardly through perforations in the casing at a desired level at some distance above the bottom of the casing. Emplacement of the cement slurry in wells is also widely practiced by injecting the slurry down the tubing, usually the drill string of the well, and upwardly into the annulus between the tubing and the casing to the level desired. Where tubing is used in the well such as in squeeze cementing operations, packers or metal retainers are usually employed.

Both blank runs for purposes of comparison and examples to illustrate the practice of the invention were made. The runs for comparison are designated by letters and the examples of the invention by numbers. Thickening time of each slurry prepared and the compressive strength of the set cement formed therefrom were determined in accordance with API RP 10B referred to above. The apparatus employed for measuring the thickening time was the Pan American Petroleum Corporation Consistometer, as described in U.S. Patent 2,771,053. A diagram and brief description of this consistometer is also set out in FIGURE 8 of API RP 10B. This consistometer provides a way of measuring the thickening time of cement slurries under conditions of temperature and pressure which are similar to those encountered in actual cementing operations in well depths ranging from 1,000 to 18,000 feet. A further description of this method of testing oil well cements, among other methods, is set forth in API Standard 10A, entitled Specification for Oil Well Cements, (1953), revised. Blank Run $a$ below was prepared by admixing 100 grams of an API Class E Cement known as TEXCOR and 40 grams of water. Examples 1 to 6 were run by admixing the same amount of Class E cement and water as in Run $a$ except that either 0.3 percent or 0.5 percent (as set out below) of the copolymer of the invention was admixed therewith. Blank $b$ was run similarly to Blank $a$ except Class A cement was used instead of Class E. Examples 7 to 9 were like Blank $b$ except that either 0.3 or 0.5 percent of the copolymer was admixed therewith in the practice of the invention. The thickening time was determined for all blanks and examples in accordance with Schedule 9 of Section VII of API RP 10B. Thickening time is defined as the time required after mixing before a viscosity of 10,000 cps. is reached. Schedule 9 simulates a well depth of 16,000 feet, a bottom hole temperature of 248° F., and a pressure of 16,140 p.s.i. In the test runs, either the sodium salt or the acid form of the substantially 1:1 molar ratio copolymer, as shown in Table I below, was used.

*Table I*

| Run No. | Retarder Employed | | Type of Cement Employed | Thickening Time According to Schedule 9 in Hours and Minutes |
|---|---|---|---|---|
| | Type | Percent by weight | | |
| Blank $a$ | None | | E | 1:33 |
| Example 1 | Sodium salts of VEO [1] and MA.[2] | 0.3 | E | 2:12 |
| Example 2 | Sodium salt of VO [3] and MA. | 0.3 | E | 3:00 |
| Example 3 | Acid or H form of VO and MA. | 0.3 | E | 3:00 |
| Example 4 | Sodium salt of VMO [4] and MA. | 0.3 | E | *4:00+ |
| Example 5 | Sodium salt of VM [5] and MA. | 0.5 | E | 2:00 |
| Example 6 | Sodium salt of VP [6] and MA. | 0.5 | E | 4:00 |
| Blank $b$ | None | | A | 0:50 |
| Example 7 | Sodium salt of VM and MA. | 0.5 | A | *4:00+ |
| Example 8 | Sodium salt of VP and MA. | 0.5 | A | *4:00+ |
| Example 9 | Sodium salt of VMO and MA. | 0.3 | A | *4:00+ |

[1] VEO = N-vinyl-5-methyl-2-oxazolidinone.
[2] MA = maleic anhydride.
[3] VO = N-vinyl-2-oxazolidinone.
[4] VMO = N-vinyl-5-methyl-2-oxazolidinone.
[5] VM = vinyl morpholinone.
[6] VP = vinyl pyrrolidone.

*4:00+ means that the thickening test was not run beyond 4 hours although thickening had yet not occurred.

Reference to Table I shows that either the sodium salt or the acid form of the copolymer of N-vinyl-2-oxazolidinone, the methyl or ethyl ring-substituted derivatives thereof or vinyl morpholinone or vinyl pyrrolidone, when copolymerized with maleic anhydride and the copolymer thus formed admixed with either a Class A or a Class E cement slurry, that an effective and desirable extension of the thickening time results.

Blank Run $a$ of Table I was repeated employing the Class E cement and the same ratio of water as therein employed but the thickening time was tested according to Schedule 20 of Section VII of API RP 10B as the thickening test. Schedule 20 simulates a well depth of 16,000 feet, a temperature of 271° F., and a pressure of 16,500 p.s.i. This run is designated Blank $c$ in Table II below. Two other blanks were run employing well-known retardants in the amounts conventionally used and the thickening time determined according to Schedule 20. These runs are designated Blanks $d$ and $e$. An example was run of the invention which employed the sodium salt of the copolymer of N-vinyl-5-methyl-2-oxazolidinone and maleic anhydride as the retardant and the thickening time also determined according to Schedule 20. The results are also set forth in Table II below.

Table II

| Run No. | Retarder Employed | | Type of Cement Employed | Thickening Time According to Schedule 20 in Hours and Minutes |
|---|---|---|---|---|
| | Type | Percent by Weight | | |
| Blank c | None | | E | 0:30 |
| Blank d | Calcium lignosulfonate | 0.50 | E | 0:34 |
| Blank e | Carboxymethylhydroxyethyl cellulose | 1.50 | E | 2:20 |
| Example 10 | Sodium salt of VMO and MA.[a] | 0.35 | E | 3:30 |

[a] See footnotes (2) and (4) of Table I.

Reference to Table II shows that the use of such well-known retardants, in aqueous cement slurries, as calcium lignosulfonate in the amount of 0.5 percent and the carboxymethylhydroxyethyl cellulose in an amount of 1.5 percent each calculated on the weight of the dry cement used, had a much less retarding effect on the rate of thickening of the aqueous cement slurry than the cement slurry made similarly except that it contained the sodium salt of the copolymer of N-vinyl-5-methyl-2-oxazolidinone and maleic anhydride in an amount of 0.35 percent in accordance with the invention. Furthermore, the slurry prepared employing the carboxymethylhydroxyethyl cellulose was very viscous and, therefore, definitely lacked the pumpability properties of the slurry prepared according to the invention.

Test runs were made to ascertain the effect of the presence of the retardant employed in the invention on the compressive strength of the set cement formed from the slurry containing the retardant in accordance with the invention and also to show the effect on thickening time of varying the amounts of the retardants within the limits of the invention.

The tests were run as follows: 100 grams of a Class A cement, known as Universal Atlas, were admixed with 46 grams of water. Thickening time was determined according to API RP 10B, Section IV, Schedule 9 described hereinabove in reference to the runs of Table I. Compressive strengths were ascertained at a simulated depth of 10,000 feet, a bottom hole temperature of 230° F. and a pressure of 3,000 p.s.i. in accordance with API Schedule 6S found on page 9, Table 6, Section V, of API RP 10B. The additament employed in the examples in accordance with the invention was the sodium salt of the copolymer of a 1:1 molar ratio of N-vinyl-5-methyl-2-oxazolidinone and maleic anhydride. The results of the examples are set out in Table III below.

Table III

| Run No. | Retarder Employed | | Type of Cement Used | Thickening Time According to Schedule 9 in Hours and Minutes | Compressive Strength in p.s.i. After 5 Hours According to Section V Schedule 6S of RP 10B |
|---|---|---|---|---|---|
| | Type | Percent by Weight | | | |
| Blank f | None | | A | 0:55 | 4,212 |
| Example 11 | Sodium salt of VMO and MA [a] | 0.1 | A | 1:06 | 4,790 |
| Example 12 | ----do---- | 0.2 | A | 2:11 | 5,480 |
| Example 13 | ----do---- | 0.25 | A | 3:30 | (b) |
| Example 14 | ----do---- | 0.30 | A | 4:00+ | 236 |
| Blank g | None | | E | 1:30 | 6,000 |
| Example 15 | Sodium salt of VMO and MA[a] | 0.1 | E | 1:39 | (b) |
| Example 16 | ----do---- | 0.2 | E | 1:32 | 5,384 |
| Example 17 | ----do---- | 0.3 | E | 4:00 | (b) |
| Example 18 | ----do---- | 0.35 | E | 4:00+ | 3,844 |
| Example 19 | ----do---- | 0.4 | E | 4:00+ | 1,584 |
| Example 20 | ----do---- | 0.5 | E | 4:00+ | 150 |

[a] See footnotes (2) and (4) of Table I.
[b] Not determined.

Reference to Table III shows that the use of as little as 0.1 percent of the sodium salt of the copolymer of maleic anhydride and N-vinyl-5-methyl-2-oxazolidinone, based on the weight of the dry cement used, when admixed with an aqueous slurry, definitely retards the setting of the slurry. It is noted that the retarding effect of the smaller percents of the retardant on the Class A cement is more pronounced than upon the Class E cement. It also shows that the retarding effect of the retardant used in the examples has a gradual effect as the amount is increased, e.g., going from 0.2 to 0.3 percent when using it with Class A cement, whereas the retarding effect is more sharp as the amount of retardant is increased in the case of the Class E cement. It is clear from the examples of Table III that the compressive strength of the set cement formed from the slurry containing the additive in accordance with the invention is excellent and it is also clear that when the additive is added in the proper amounts, i.e., amounts that are not so excessive as to "over-retard" the setting of the slurry, the compressive strength is actually improved. The "over-retarding" effect is borne out by the fact that the lower compressive values for the slurries were due to the addition of more of the retardant than was necessary. However, had such "over-retarded" cement slurries been allowed to set for a sufficient length of time, the ultimate compressive strength would have been satisfactory.

The practice of the invention clearly makes possible, without appreciable inconvenience, difficulty, or expense, a readily pumpable aqueous cement slurry of Portland or aluminous cement having extended thickening and setting times which slurry ultimately sets, as controlled by the amount of additament, to a hard monolithic solid in situ in the well. The slurry thus made is highly useful in all types of well cementing operations, e.g. surface cementing and subsurface cementing including squeeze cementing and is particularly useful in deep well cementing where advanced temperatures and pressures exist.

Having described the invention, what is claimed and desired to be protected by Letters Patent is:

1. A cementing composition consisting essentially of water, an hydraulic cement selected from the class consisting of Portland and aluminous cements, and between 0.05 and 1.5 percent based on the weight of the dry hydraulic cement used of a copolymer of maleic anhydride and a vinyl nitrogen-containing ring compound selected from the class consisting of N-vinyl morpholinone, N-vinyl pyrrolidone, N-vinyl-2-oxazinidinone, N-vinyl-2-oxazolidinone, and ring-substituted alkyl derivatives thereof wherein the alkyl groups are selected from the class consisting of methyl and ethyl groups.

2. A cementing composition consisting essentially of water, an hydraulic cement selected from the class consisting of Portland and aluminous cement, and a copolymer of maleic anhydride and a vinyl nitrogen-containing ring compound selected from the class consisting of N-vinyl morpholinone, N-vinyl pyrrolidone, N-vinyl-2-oxazinidinone, N-vinyl-2-oxazolidinone, and alkyl ring-substituted derivatives thereof wherein the alkyl groups are selected from the class consisting of methyl and ethyl in an amount between 0.2 and 0.5 percent of the copolymer based on the weight of the dry hydraulic cement employed.

3. A cementing composition consisting essentially of water, an hydraulic cement selected from the class consisting of Portland and aluminous cements, and between 0.05 and 1.5 percent based on the weight of the dry hydraulic cement employed of a copolymer of maleic anhydride and N-vinyl-5-methyl-2-oxazolidinone.

4. A cementing composition consisting essentially of water, an hydraulic cement selected from the class consisting of Portland and aluminous cements, and between 0.2 and 0.4 percent based on the weight of the dry cement employed of a copolymer of maleic anhydride and N-vinyl-5-methyl-2-oxazolidinone, in a substantially 1:1 molar ratio.

5. The method of cementing a well consisting of admixing an hydraulic cement selected from the class consisting of aluminous and Portland cement and water and between 0.05 and 1.5 percent based on the weight of the dry cement employed of a copolymer of maleic anhydride and a vinyl nitrogen-containing ring compound selected from the class consisting of N-vinyl morpholinone, N-vinyl pyrrolidone, N-vinyl-2-oxazinidinone, N-vinyl-2-oxazolidinone, and ring-substituted alkyl derivatives thereof wherein the alkyl groups are selected from methyl and ethyl, and injecting the slurry thus made down the well and positioning it at the level to be cemented.

6. The method of claim 5 wherein the copolymer is a substantially 1:1 molar ratio of maleic anhydride and N-vinyl-5-methyl-2-oxazolidinone.

7. The method of cementing a well consisting essentially of admixing water, an hydraulic cement selected from the class consisting of Portland and aluminous cements, and between 0.2 and 0.4% based on the weight of the dry cement employed of a copolymer of maleic anhydride and N-vinyl-4-methyl-2-oxazolidinone to provide an aqueous cement slurry having retardant thickening and setting characteristics and improved pumpability, and injecting the slurry so made down the well and positioning it at the level to be cemented.

8. The method of cementing a well consisting essentially of admixing water, an hydraulic cement selected from the class consisting of Portland and aluminous cements, and between 0.2 and 0.4% based on the weight of the dry cement employed of a copolymer of maleic anhydride and N-vinyl-4-ethyl-2-oxazolidinone to provide an aqueous cement slurry having retardant thickening and setting characteristics and improved pumpability, and injecting the slurry so made down the well and positioning it at the level to be cemented.

References Cited in the file of this patent

UNITED STATES PATENTS

| | | |
|---|---|---|
| 2,625,529 | Hedrick et al. | Jan. 13, 1953 |
| 2,676,949 | Morner et al. | Apr. 27, 1954 |
| 2,868,753 | Morgan et al. | Jan. 13, 1959 |
| 3,044,992 | Hibbard et al. | July 17, 1962 |